United States Patent
Chen

(10) Patent No.: US 11,268,287 B2
(45) Date of Patent: Mar. 8, 2022

(54) ANTI-SLIP, NOISE REDUCING PAD DIRECTLY APPLIED AND ADHERED TO THE BACK OF FLOORING MATERIALS AND METHOD

(71) Applicant: Wellmade Floor Covering Int'l Inc., Wilsonville, OR (US)

(72) Inventor: Zhu Chen, Jiangsu (CN)

(73) Assignee: WELLMADE FLOOR COVERING INT'L INC., Wilsonville, OR (US)

( * ) Notice: Subject to any disclaimer, the term of this patent is extended or adjusted under 35 U.S.C. 154(b) by 639 days.

(21) Appl. No.: 16/241,004

(22) Filed: Jan. 7, 2019

(65) Prior Publication Data
US 2020/0157822 A1    May 21, 2020

(30) Foreign Application Priority Data
Nov. 20, 2018   (CN) .......................... 201811384214.8

(51) Int. Cl.
| E04F 15/20 | (2006.01) |
| E04F 15/02 | (2006.01) |
| E04F 15/16 | (2006.01) |
| E04F 15/18 | (2006.01) |
| E04F 15/10 | (2006.01) |

(52) U.S. Cl.
CPC .......... *E04F 15/20* (2013.01); *E04F 15/0215* (2013.01); *E04F 15/02044* (2013.01); *E04F 15/02172* (2013.01); *E04F 15/163* (2013.01); *E04F 15/181* (2013.01); *E04F 15/185* (2013.01); *E04F 15/10* (2013.01)

(58) Field of Classification Search
CPC . E04F 15/20; E04F 15/02044; E04F 15/0215; E04F 15/163; E04F 15/181; E04F 15/185
See application file for complete search history.

(56) References Cited

U.S. PATENT DOCUMENTS

| 8,397,456 | B2 * | 3/2013 | Ruhdorfer | ............. | E04F 15/181 52/309.8 |
| 2003/0161994 | A1 * | 8/2003 | Je-Suk | .................... | B32B 3/266 428/138 |
| 2013/0055665 | A1 * | 3/2013 | Qiong | ............... | E04F 15/02172 52/177 |
| 2014/0329062 | A1 * | 11/2014 | Song | ..................... | E04F 15/107 428/201 |
| 2015/0047282 | A1 * | 2/2015 | Ford | .................... | E04F 15/105 52/309.1 |

(Continued)

FOREIGN PATENT DOCUMENTS

| EP | 1426522 A2 * | 6/2004 | ............. E04F 15/20 |
| GB | 2412930 A  * | 10/2005 | ............. E04F 15/20 |

(Continued)

*Primary Examiner* — Patrick J Maestri
(74) *Attorney, Agent, or Firm* — Thompson Coburn LLP

(57) ABSTRACT

Flooring material has an anti-slip, noise reducing pad directly self-adhered to a bottom surface. The pad is formed by applying a foamable PVC material is directly on the bottom surface of the flooring and heating the PVC material to foam the PVC material. The PVC material may then be cooled to form the pad with a definite formed shape having a resilient outer surface layer and a spongy foamy inner structure.

5 Claims, 7 Drawing Sheets

(56) References Cited

U.S. PATENT DOCUMENTS

| | | | | |
|---|---|---|---|---|
| 2015/0176275 | A1* | 6/2015 | Laukhuff | B32B 17/02 |
| | | | | 428/76 |
| 2015/0375471 | A1* | 12/2015 | Song | E04F 15/105 |
| | | | | 428/159 |
| 2017/0314259 | A1* | 11/2017 | Pelletier | E04F 15/203 |
| 2017/0328073 | A1* | 11/2017 | Saladino | B32B 27/08 |
| 2018/0163413 | A1* | 6/2018 | Odum | B29C 43/24 |
| 2019/0211570 | A1* | 7/2019 | Vogt | B32B 7/06 |
| 2019/0301179 | A1* | 10/2019 | Chen | B32B 5/18 |

FOREIGN PATENT DOCUMENTS

| | | | | |
|---|---|---|---|---|
| WO | WO-0146534 A1 * | 6/2001 | | B32B 37/12 |
| WO | WO-2011058205 A2 * | 5/2011 | | C04B 37/008 |

* cited by examiner

ANTI-SLIP, NOISE REDUCING PAD DIRECTLY APPLIED AND ADHERED TO THE BACK OF FLOORING MATERIALS AND METHOD

RELATED APPLICATION DATA

This application claims the benefit of Chinese patent application CN 201811384214.8, filed Nov. 20, 2018, the disclosure of which is incorporated by reference herein.

BACKGROUND

The present disclosure relates to an anti-slip, noise reducing pad or backing layer that may be directly applied and may be self-adhered to the back of a substrate comprising a flooring material. By way of example and not in any limiting sense, the flooring material and/or substrate as used hereinafter may be any following: a solid wood flooring/hardwood flooring, an engineered flooring, a laminated flooring, an LVT flooring/WPC flooring, an SPC flooring, a WPC flooring, an HDPC flooring, an antistatic flooring, a cork flooring, or an MgO board flooring, stone, marble, granite, ceramic tile, or carpet. The present disclosure also discusses a method of preparing such a pad or backing layer, and equipment for application of the pad to such flooring materials.

Flooring materials that are mounted on the ground generally will have a layer of material such as IXPE foam, EVA foam, rubber, cork, and plastic film adhered to the back with an adhesive. However, the layer of backing material is generally insufficient in providing an anti-slip slide effect and is generally high in cost. Moreover, the steps of cutting and sticking the backing to the flooring materials involve high labor costs and inefficiencies in the production of the flooring materials.

SUMMARY

The present disclosure seeks to solve these drawbacks. As described below, an anti-slip, noise reducing pad is provided that may be directly self-adhered to the back or bottom surface of a substrate comprising a flooring material. The pad or backing layer may be made from a pasty or tacky PVC material that is directly coated on the back of the flooring material, and then foamed by heating. The PVC material may be applied, heated and foamed, and then optionally cooled or quenched after heating, in a continuous process during the production of the flooring material, which can therefore greatly reduce labor costs. Prior to application to the flooring material, the PVC material is preferably tacky and in a paste-like format so that the PVC may be self-adhering to the back of the flooring material when applied thereto. The PVC material may have a viscosity allowing it to flow easily and controllably during the application process. The PVC material may have properties allowing it to expand into a foam-like structure when heated. The cell structure may be open or closed. After being heated and foamed, and then subject to rapid cooling or quenching, the PVC material may have properties allowing it to retain a fixed and formed shape with a resilient outer surface layer and a soft and spongy foam like inner structure.

The method of coating the PVC material on the back of the flooring material may include any one or combination of showering, roll coating, brushing, spraying, transfer printing, screen printing, and dispensing the PVC material on to the back of the flooring material. The PVC material that is coated on the back of the flooring material may be applied in a pattern comprising any one or combination of dots or lines, and may cover between about 40 percent and 85 percent of the area of the bottom surface of the substrate as determined before heating and foaming.

The thickness of the backing layer may be between 0.6 mm and 2.0 mm. The foaming ratio of the PVC material may be between 8:1 and 20:1. The density of the foamed PVC may be between 0.3 tons/m$^3$ and 0.8 tons/m$^3$.

A mesh may be included on the back of the flooring material. The back of the flooring material or bottom surface of the substrate may be overlaid with the mesh, and the mesh may be adhered to the bottom surface of the substrate or flooring material with the PVC material. The PVC material may be directly coated on or applied to the mesh. By way of example and not in any limiting sense, the mesh may be a fiberglass mesh, a polyester mesh, a polyamide mesh, a spandex mesh, and a cotton mesh. The mesh size may be approximately 1 mm to 10 mm by 1 mm to 10 mm.

In one aspect of the disclosure a method is provided. The method includes preparing the PVC material, providing a flooring material, directly coating the PVC material on the back of the flooring material, and then foaming the PVC material by heating the PVC material so as to form a foamed PVC anti-slip, noise reducing pad on the back of the flooring material. In another aspect of the method, the step of directly applying the PVC material on the back of the flooring material includes applying the PVC material in a pattern comprising at least one of dots and lines. In another aspect of the method, the step of directly applying the PVC material on the back of the flooring material includes covering between about 40 percent and about 85% of the area of the bottom surface of the substrate with the PVC material, as determined before heating and foaming.

In other aspect of the method, the back of the flooring material may be overlaid with a mesh, the PVC material may be directly coated on the mesh, and the mesh may be adhered to the back of the flooring material with the PVC material.

In another aspect of the method, the back of the flooring material may be cleaned. Then, the cleaned flooring materials may be directed into an oven. An inlet end of the oven may be provided with a roller having a through-hole pattern of dots or lines. The PVC material may be directed into the roller and the roller may be rotated relative to the flooring material as the flooring material passes by the roller. The PVC material directed into the roller may be applied to the back of the flooring material through the through-holes in the roller. Then, using the heat from the oven, the PVC material coated on the back of the flooring material may be heated and foamed. Once foamed, the flooring material may be removed from the oven.

In another aspect of the method, the step of cleaning the back of the flooring includes sanding, then electrostatic elimination of any debris particles, and finally dedusting the flooring material. The step of cleaning the back of the flooring material may also include brushing with a brush, electrostatic elimination of any debris particles, and then dedusting the flooring material before the flooring material is directed into the oven. Once the back of the flooring material is cleaned and overlaid with a mesh, the flooring material may be directed to an oven to foam the PVC material and form the backing.

In another aspect, a cooling device maybe further included. After being taken out of the oven, the flooring material coated with the foamed PVC material may be fed into the cooling device and cooled/quenched to facilitate formation of a resilient outer surface layer with a spongey, foam inner structure.

A color powder, color concentrate, or color paste may be added to the PVC material to tint the PVC material before application to the flooring material or substrate.

Equipment for applying the PVC material to the flooring material may include an upper roll, a lower roll, an oven, and a coating roller. The upper roll and the lower roll may rotate in opposite directions to feed the flooring material into the oven. The coating roller may be disposed at an inlet end of the oven. The coating roller may have a through-hole pattern comprising at least one of dots and lines. A feed box filled with the PVC material may be connected to the roller through a material tube to deliver the PVC material from the feed box to the roller. The oven may have a heating device sufficient to foam the PVC material. As the flooring material moves toward the oven, the coating roller may rotate and apply the PVC material from the coating roller onto the back of the flooring material or bottom surface of the substrate. The application may be by way of a dripping effect where the effect of gravity allows the PVC material to be applied to the back of the flooring material. The PVC material may then be foamed by the heating device as the flooring material passes through the oven.

A sander/bristle brush roller, an electrostatic eliminator and/or dedusting device may be included and provided upstream of the upper roll and lower roll so that the flooring may be fed into the oven by the upper roll and the lower roll after being treated by the sander, the electrostatic eliminating and/or dedusting device. The sander/bristle brush roller and the electrostatic eliminating and dedusting device can also be configured to treat the surface of the back of the flooring material so that the surface condition is as smooth as possible, such that the PVC material forms a strong surface bond with the flooring material or the bottom surface of the substrate.

The oven may be further provided with a scraper and/or a brush roller. The scraper may be provided downstream of the coating roller. When the brush roller is provided, the scraper may be located between the brush roller and the coating roller. The scraper may have a controllable height and angle relative to the flooring material being conveyed. When provided, the brush roll may be located downstream of the coating roller. When provided, the brush roller may also have an adjustable height relative to the flooring material being conveyed. The brush roller may have bristles on the surface of the brush roller. During operation, the brush roller may rotate in the same direction as the coating roller in the general direction of advancement of the flooring material. In one aspect, during production, the scraper may be used without the brush roller, and the height and angle of the scraper may be adjusted such that the scraper just contacts the bottom surface of the substrate to scrape excess PVC material from the flooring material and press the PVC material onto the flooring material. In another aspect, during operation, the brush roller may be used without the scraper and moved so that the bristles provided on the surface of the brush roller approach but do not contact the coating roller. The lower surface of the brush roller may be adjusted to contact the surface of the back of the flooring material and smooth the PVC material by brushing the PVC material just applied to the flooring material. Brushing the back of the flooring material after the PVC material has been applied to the back of the flooring material enables the PVC material to form a strong surface bond with the back surface of the flooring material. In another aspect, during production, the scraper may be used with the brush roller. The height and angle of the scraper may be adjusted such that an edge of the scraper may lightly contact the lower side of the brush roller to scrape excess PVC material from brush roller and prevent any PVC material from fouling the top side of the flooring material as the brush roller presses the PVC material onto the bottom surface of the substrate.

The heating device of the oven may be an electric heating wire, a microwave heating tube, an electromagnetic heating tube or an infrared heating tube that is disposed in the oven. The heating device may be spatially separated from the coating roller and feed box by a distance sufficient to prevent the PVC material from being heated and foaming in the roller and/or feed box.

The cooling device may be included downstream from the oven so that the flooring material taken from the oven may be fed into the cooling device and cooled. The cooling device rapidly cools the flooring material and the adhered and foamed PVC material so that the PVC material may have a fixed and formed shape with a resilient outer surface layer and a soft and spongy inner structure.

A mesh coil feeding device and a mesh conveying roll may be further included. The mesh coil feeding device may be located above the flooring material being conveyed. As the mesh coil feeding device rotates, the mesh may be unwound from the coil and hung above the flooring material in a position between the upper roll and the coating roller, and then directed onto the flooring material.

It has been found that a pad formed and applied to the back of flooring material as described herein has good buffering and balancing effects, and good sound insulation and dampening, and anti-slide characteristics. The methods described herein can achieve continuous production of a flooring material, thus reducing the labor cost and eliminating separate adhesives used to adhere conventional backing pads to flooring materials.

As mentioned earlier, it is desirable to apply the PVC material with between 40 and 85 percent coverage. Below 40 percent, the pad may be insufficient to provide sufficient to provide anti-slip and noise reduction and dampening characteristics. If the coating exceeds 85 percent coverage, the PVC material may excessively expand after heating and foaming, such that the edge of the pad may protrude beyond the edges of the flooring material thereby requiring secondary trimming or edging operations, or the pad may have bumps, which may require scrapping of the production and cause adverse yields. By applying the PVC material on the back of the flooring material in a dotted and/or linear pattern, the coverage may be controlled and the amount of PVC material used may be controlled and further reduced. When the pad is provided with a mesh layer, pockets of air may be contained in the pad enabling the pad to form a more elastic contact between the flooring material and the ground surface, thus improving comfort during walking while preventing the flooring from deforming. When the flooring is mounted using an adhesive, the adhesive can be directly applied to the PVC material on the back of the flooring material, thus having a better bonding effect than conventional backing pads. Additionally, by applying the PVC material on the back of the flooring material in a dotted and/or linear pattern, a personalized pattern can be formed. For example, the dots and lines of the dot matrix and linear pattern may form a logo of business or enterprise or the name of a user. The PVC material can be further dyed to further increase the aesthetic appeal of the pad.

DETAILED DESCRIPTION

Figure 1:
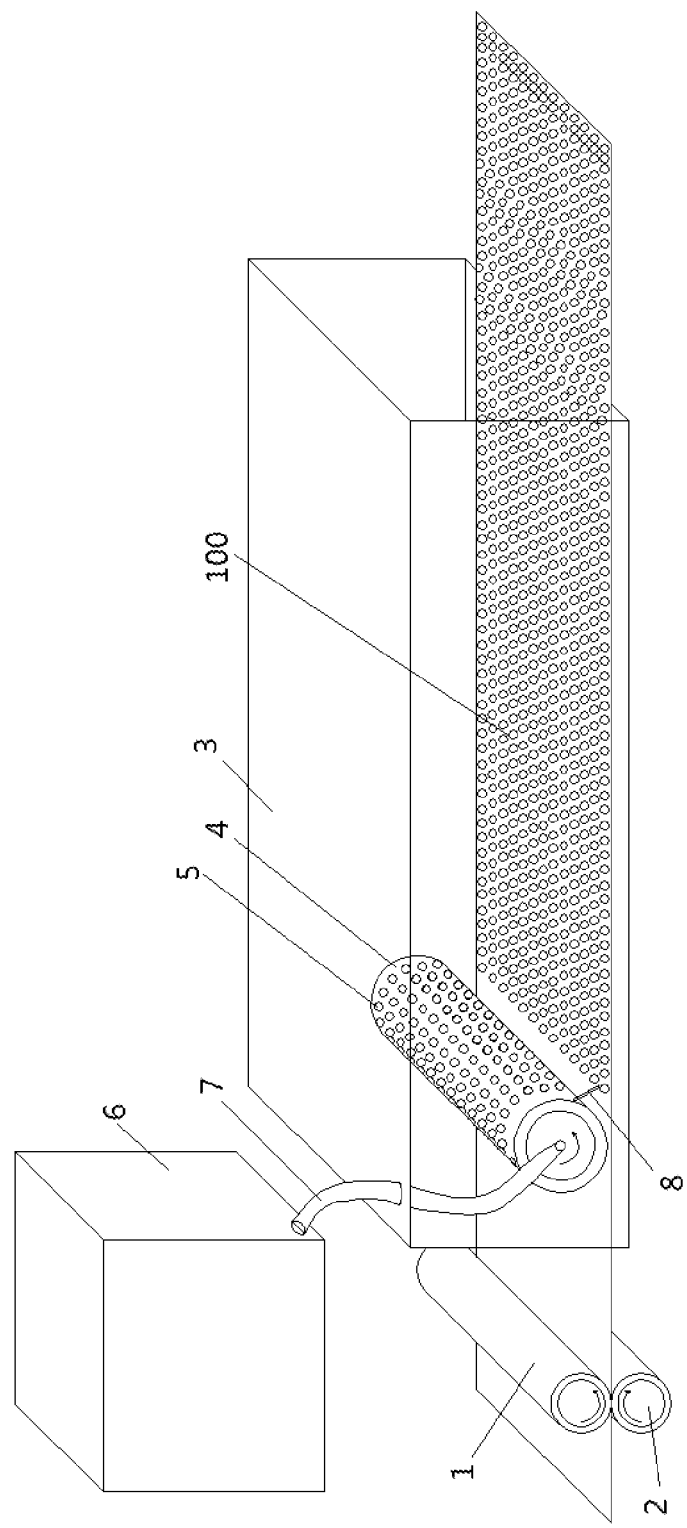
FIG. 1 is a schematic structural diagram of an exemplary embodiment of coating and foaming equipment for an anti-slip, noise reducing pad directly applied and adhered to the back of a flooring material.

The description that follows includes many examples of forming an anti-slip, noise reducing pad that may be directly self-adhered to the back of a flooring, ceramic tile, stone or carpet. In being directly self adhered to the back of the flooring material, no intermediate adhesives are used to adhere the backing layer to the flooring material or substrate. The examples that follow provide illustrative methods, and should not be deemed to be limiting in any sense.

As will be described, the pad may be made from a pasty or tacky foamable PVC material that is directly coated on the back of the flooring material, and then foamed by heating. The PVC material may be applied, heated, foamed and cooled in a continuous process during the production of the flooring material. The PVC material may be applied and adhered on the back of the flooring material by showering, roll coating, brushing, spraying, transfer printing, screen printing, and dispensing the material on to the back of the flooring material. The PVC material that is coated on the back of the flooring material may be applied in a dotted pattern, a linear pattern, or a combination of both, and has a coverage rate of between 40 percent and 85 percent.

Embodiment 1

A method of preparing an anti-slip, noise reducing pad adhered to the back of solid wood flooring includes the following steps:

(1) first sanding the back of the solid wood flooring and then performing electrostatic elimination and dedusting of the flooring;

(2) feeding the flooring with the cleaned back into an oven by double rolls, wherein a coating roller provided with dotted through-holes is disposed at an inlet end of the oven, adding a foamable PVC material into the roller, moving the flooring while rotating the roller located above the flooring, and dripping the foamable PVC material in the roller onto the back of the flooring through the through-holes; and (3) heating up the oven by using a heating device in the oven, through the effect of the elevated temperature in the oven, foaming the PVC material coated on the back of the flooring to form an anti-slip, noise reducing pad adhered to the back of the flooring, taking the flooring out from the oven, and cooling the flooring naturally. The formed anti-slip, noise reducing pad is uniformly distributed on the back of the flooring as dots, and the coverage rate of the PVC material in the anti-slip, noise reducing pad on the back of the flooring is 40%.

Embodiment 2

A method of preparing an anti-slip, noise reducing pad adhered to the back of a ceramic tile includes the following steps:

(1) first sanding the back of the ceramic tile and then performing electrostatic elimination and dedusting of the tile;

(2) feeding the ceramic tile with the cleaned back into an oven by double rolls, wherein a roller provided with dotted through-holes and linear through-holes is disposed at an inlet end of the oven, adding a foamable PVC material into the roller, moving a flooring while rotating the roller located above the ceramic tile, and dripping the foamable PVC material in the roller onto the back of the ceramic tile through the through-holes; and (3) heating up the oven by using a heating device in the oven, through the effect of the elevated temperature in the oven, foaming the PVC material coated on the back of the ceramic tile to form an anti-slip, noise reducing pad adhered to the back of the ceramic tile, taking the ceramic tile out from the oven, and cooling the ceramic tile naturally. The formed anti-slip, noise reducing pad is distributed on the back of the ceramic tile as dots and lines, and the coverage rate of the PVC material in the anti-slip noise reducing pad on the back of the ceramic tile is 85%.

Embodiment 3

A method of preparing an anti-slip noise reducing pad adhered to the back of a ceramic tile includes the following steps:

(1) performing electrostatic elimination and dedusting of the back of the carpet;

(2) feeding the carpet with the cleaned back into an oven by double rolls, wherein a roller provided with linear through-holes is disposed at an inlet end of the oven, adding a foamable PVC material into the roller, moving a flooring while rotating the roller located above the carpet, and dripping the foamable PVC material in the roller onto the back of the carpet through the through-holes; and (3) heating up the oven by using a heating device in the oven, through the effect of the elevated temperature in the oven, foaming the PVC material coated on the back of the carpet to form an anti-slip noise reducing pad adhered to the back of the carpet, taking the carpet out from the oven, and cooling the carpet naturally. The formed anti-slip, noise reducing pad is distributed on the back of the carpet as lines, and the coverage rate of the PVC material in the anti-slip, noise reducing pad on the back of the carpet is 70%.

Embodiment 4

A method of preparing an anti-slip, noise reducing pad adhered to the back of laminated, engineered flooring includes the following steps:

(1) first sanding the back of the laminated engineered flooring and then performing electrostatic elimination and dedusting of the flooring;

(2) feeding the flooring with the cleaned back into an oven by double rolls, wherein a roller provided with dotted through-holes and/or linear through-holes is disposed at an inlet end of the oven, adding a foamable PVC material into the roller, moving the flooring while rotating the roller located above the flooring, and dripping the foamable PVC material in the roller onto the back of the flooring through the through-holes; and (3) through the effect of the elevated temperature in the oven, foaming the PVC material coated on the back of the flooring to form an anti-slip, noise reducing pad adhered to the back of the flooring, taking the flooring out from the oven, cooling the flooring in a cooling device, and then taking the flooring out from the cooling device.

Embodiment 5

A method of preparing an anti-slip, noise reducing pad adhered to the back of flooring includes the following steps:

(1) first sanding the back of the flooring and then performing electrostatic elimination and dedusting of the flooring;

(2) covering a layer of fiberglass mesh, polyester mesh, polyamide mesh, spandex mesh, or cotton mesh directly on the back of the flooring without using any adhesive;

(3) feeding the flooring overlaid with a layer of mesh into an oven by double rolls, wherein a roller provided with dotted through-holes and/or linear through-holes is disposed at an inlet end of the oven, adding a foamable PVC material into the roller, moving the flooring while rotating the roller located above the flooring, and dripping the foamable PVC material in the roller onto the back of the flooring through the through-holes; and (4) heating up the oven by using a heating device in the oven, through the effect of the elevated temperature, foaming the PVC material coated on the back of the flooring to form an anti-slip, noise reducing pad adhered to the back of the flooring, taking the flooring out from the oven, cooling the flooring in a cooling device, and then taking the flooring out from the cooling device.

Embodiment 6

A method of preparing an anti-slip, noise reducing pad adhered to the back of a ceramic tile includes the following steps:

(1) directly roll-coating a layer of a foamable PVC material on the back of the ceramic tile; and foaming the PVC material by heating the PVC material to form an anti-slip, noise reducing pad adhered to the back of the ceramic tile.

Embodiment 7

A method of preparing an anti-slip, noise reducing pad adhered to the back of LVT flooring/WPC flooring includes the following steps:

(1) first sanding the back of the flooring and then performing electrostatic elimination and dedusting of the flooring;

(2) covering a layer of mesh on the back of the flooring; and (3) spraying a layer of a foamable PVC material on the mesh; and foaming by heating the PVC material to form an anti-slip, noise reducing pad self-adhered to the back of the flooring.

Embodiment 8

A method of preparing an anti-slip, noise reducing pad adhered to the back of SPC flooring includes the following steps:

(1) showering a foamable PVC material on the back of the SPC flooring to form a layer of the foamable PVC material on the back of the SPC flooring; and (2) foaming the PVC material by heating the PVC material to form an anti-slip, noise reducing pad adhered to the back of the flooring.

Embodiment 9

A method of preparing an anti-slip, noise reducing pad adhered to the back of SPC flooring includes the following steps:

(1) sanding the back of the flooring and then performing electrostatic elimination and dedusting of the SPC flooring; and (2) transfer-printing a layer of a foamable PVC material on the cleaned back of the SPC flooring; and (3) foaming the PVC material by heating the PVC material to form an anti-slip, noise reducing pad adhered to the back of the flooring. By means of transfer-printing, various patterns and figures can be formed on the anti-slip, noise reducing pad.

Embodiment 10

A method of preparing an anti-slip, noise reducing pad adhered to the back of a carpet includes the following steps:

(1) brush-coating a layer of a foamable PVC material directly on the back of the carpet; and (2) foaming the PVC material by heating the PVC material to form an anti-slip, noise reducing pad adhered to the back of the carpet.

Embodiment 11

A method of preparing an anti-slip, noise reducing pad adhered to the back of HDPC flooring includes the following steps:

(1) roll-coating a layer of a foamable PVC material on the back of the HDPC flooring; and (2) foaming the PVC material by heating the PVC material to form an anti-slip, noise reducing pad adhered to the back of the flooring.

Embodiment 12

A method of preparing an anti-slip, noise reducing pad adhered to the back of WPC flooring includes the following steps:

(1) first sanding the back of the WPC flooring and then performing electrostatic elimination and dedusting of the flooring;

(2) feeding the flooring with the cleaned back into an oven by double rolls, wherein a roller provided with dotted through-holes and/or linear through-holes is disposed at an inlet end of the oven, adding a foamable PVC material into the roller, wherein color powder is added into the foamable PVC material in advance for coloring, moving the flooring while rotating the roller located above the flooring, and dripping the foamable PVC material in the roller onto the back of the flooring through the through-holes; and (3) heating up the oven by using a heating device in the oven, foaming the PVC material coated on the back of the flooring at the temperature of 140° C. to form an anti-slip, noise reducing pad directly self-adhered to the back of the flooring, taking the flooring out from the oven, and cooling the flooring naturally. By using this method, various patterns and figures can be formed on the anti-slip, noise reducing pad.

By way of example and not in any limiting sense, in connection with the foregoing example or any of the methods and examples described herein, the foamable PVC material may comprise (%/weight):

| | |
|---|---|
| Resin emulsion PVC | 72%/wgt |
| CaHCO₃ | 0.45%/wgt |
| Foamer AC | 0.45%/wgt |
| Plasticizer DOP | 2.0%/wgt |
| PE wax | 1.0%/wgt |
| G60 | 0.9%/wgt |
| Stabilizer tribasic lead sulfate | 3.0%/wgt |
| Stabilizer dibasic lead sulfite | 0.2%/wgt |
| Stabilizer HSt | 0.5%/wgt |
| MBS | 5.0%/wgt |
| ACR | 3.0%/wgt |
| CaCO₃ | 10%/wgt |
| Color powder | 1.5%/wgt |

Embodiment 13

A method of preparing an anti-slip, noise reducing pad directly self-adhered to the back of SPC flooring includes the following steps:

(1) first sanding the back of the flooring and then performing electrostatic elimination and dedusting of the flooring; and (2) screen-printing a layer of foamable PVC material on the back of the cleaned back of the SPC flooring, wherein color paste is added into the foamable PVC material in advance for coloring, and (3) foaming the PVC material by heating the flooring to 200° C., so as to form an anti-slip, noise reducing pad directly self-adhered to the back of the flooring. By using the screen-printing method, various patterns and figures can be formed on the anti-slip, noise reducing pad.

By way of example and not in any limiting sense, in connection with the foregoing example or any of the methods and examples described herein, the foamable PVC material may comprise (%/weight):

| | |
|---|---|
| Resin emulsion PVC | 80%/wgt |
| Foamer AC | 3%/wgt |
| Stabilizer tribasic lead sulfate | 3.0%/wgt |
| Dibasic lead stearate | 0.2%/wgt |
| PE wax | 0.3%/wgt |
| Lubricant pbst | 0.5%/wgt |
| Filler CaCO₃ | 12%/wgt |
| Color concentrate | 0.8%/wgt |

Embodiment 14

A method of preparing an anti-slip, noise reducing pad adhered to the back of HDPC flooring includes the following steps:

(1) first sanding the back of the HDPC flooring and then performing electrostatic elimination and dedusting of the flooring; and (2) dispensing a layer of a foamable PVC material on the cleaned back of the SPC flooring; and (3) foaming the PVC material by heating the PVC material to form an anti-slip, noise reducing pad directly self-adhered to the back of the flooring. By using the dispensing method, various patterns and figures can be formed on the anti-slip, noise reducing pad.

Embodiment 15

As shown in FIG. 1, coating and foaming equipment for applying the foamable PVC material to back of the flooring material to form an anti-slip, noise reducing pad adhered to the back of the flooring material may include an upper roll 1, a lower roll 2, an oven 3, and a coating roller 4. The upper roll 1 and the lower roll 2 rotate in opposite directions to feed the flooring material 100 into the oven. The coating roller 4 is disposed at an inlet end of the oven 3. The coating roller 4 may have a pattern of dotted through-holes 5 on an outer surface of the roller. A feed box 6 filled with the foamable PVC material may be connected to the coating roller 4 through a material flow tube 7. The oven is further provided with a heating device (not shown) for elevating the temperature of the oven sufficiently to foam the PVC material. The heating device may be an infrared heating tube uniformly disposed on one side of the oven sufficiently far away from the coating roller to preventing foaming of the PVC material in the roller and to maintain the PVC material in a liquid and viscous state allowing it to be applied to the flooring material. The flooring material moves in the direction of the oven while the roller rotates along a traveling direction of the flooring. The foamable PVC material in the roller may be applied (for instance, by dripping under the effect of gravity) onto the flooring material. Once the flooring enters the oven and heated, the PVC material may be foamed. The oven may be further provided with a scraper 8 having a controllable height and angle. During production, the height and angle of the scraper 8 may be adjusted such that an edge of the scraper 8 may lightly contact the flooring material 100 to scrape excess PVC material from the flooring material and prevent the PVC material from fouling the top side of the flooring material.

Embodiment 16

Figure 2:
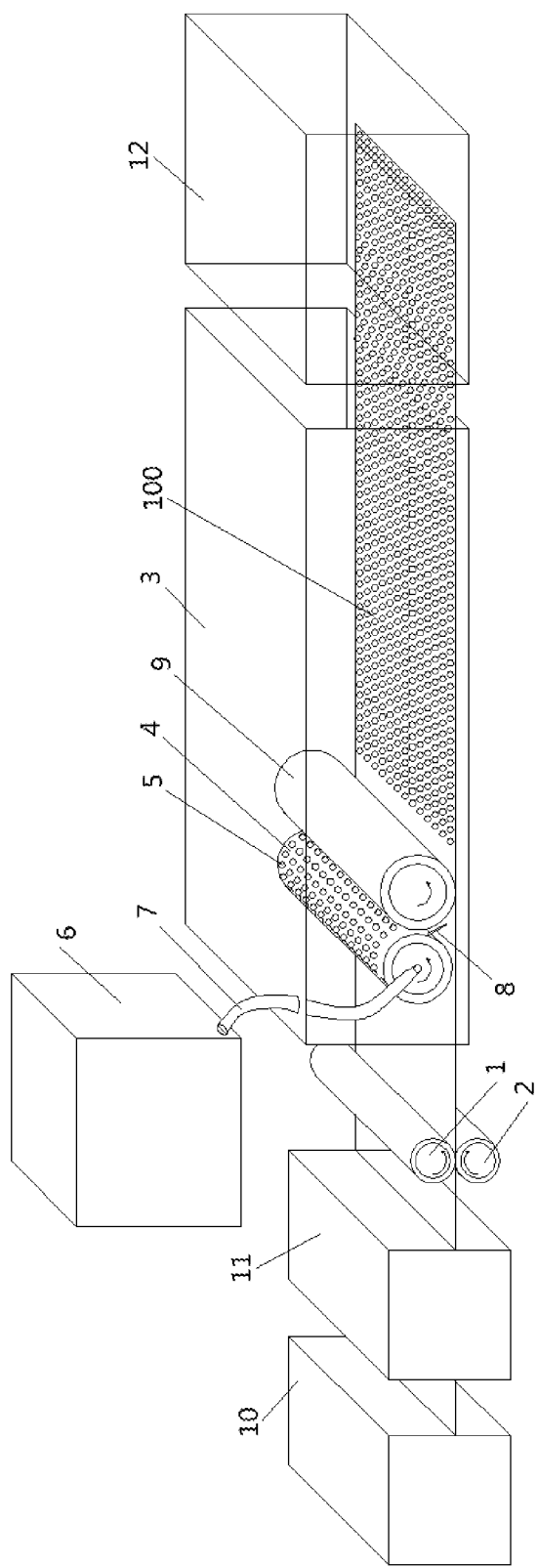
FIG. 2 is a schematic structural diagram of another exemplary embodiment of coating and foaming equipment for an anti-slip, noise reducing pad directly applied and adhered to the back of a flooring material.

As shown in FIG. 2, coating and foaming equipment for applying the foamable PVC material to back of the flooring material to form an anti-slip, noise reducing pad adhered to the back of the flooring material may include an upper roll 1, a lower roll 2, an oven 3, and a coating roller 4. The upper roll 1 and the lower roll 2 may rotate in opposite directions to feed the flooring material toward the oven 3. The coating roller 4 is disposed at an inlet end of the oven 3. The coating roller may be provided with a pattern of dotted through-holes 5 formed on the outer surface of the roller. A feed box 6 filled with the foamable PVC material may be connected to the coating roller 4 through a material flow tube 7. The oven 3 is further provided with a heating device (not shown) for elevating the temperature of the oven sufficiently to foam the PVC material. The heating device may be an electric heating wire, a microwave heating tube, or an electromagnetic heating tube uniformly disposed on one side of the oven sufficiently far away from the coating roller to preventing foaming of the PVC material in the roller and to maintain the PVC material in a liquid and viscous state allowing it to be applied to the flooring material. The flooring material moves in the direction of the oven while the roller rotates along a traveling direction of the flooring. The foamable PVC material in the roller may be applied (for instance, by dripping under the effect of gravity) onto the flooring material. Once the flooring enters the oven and heated, the PVC material may be foamed. The oven may be further provided with a scraper 8 having a controllable height and angle, and a brush roller 9. During production, the height and angle of the scraper 8 may be adjusted such that an edge of the scraper may lightly contact the lower side of the brush roller 9 to scrape excess PVC material from brush roller and prevent any PVC material from fouling the top side of the flooring material. The brush roller may be located downstream of the coating roller. The brush roller may have an adjustable height, and may have bristles on the surface of the brush roller. During operation, the brush roller rotates in the same direction as the coating roller 4 in the general direction of advancement of the flooring material. The brush roller 9 may be positioned to approach but not contact the coating roller 4. The brush roller may be moved so that the lower surface of the brush roller 9 lightly contacts the surface of the back of the flooring material, so as to smooth the PVC material just applied to the flooring material with the coating roller, such that the PVC forms a more secure surface bond with the surface of the flooring material. A sander 10 and an electrostatic eliminating and dedusting device 11 are further included upstream of the upper and lower rollers 1,2. The flooring material is directed into the oven by the upper roll 1 and the lower roll 2 after being treated by the sander 10 and the electrostatic eliminating and dedusting device 11. A cooling device 12 is further included downstream of the oven 3. After the flooring material 100 leaves the oven 3, the flooring material is directed into the cooling device 12 and cooled.

Embodiment 17

Figure 3:
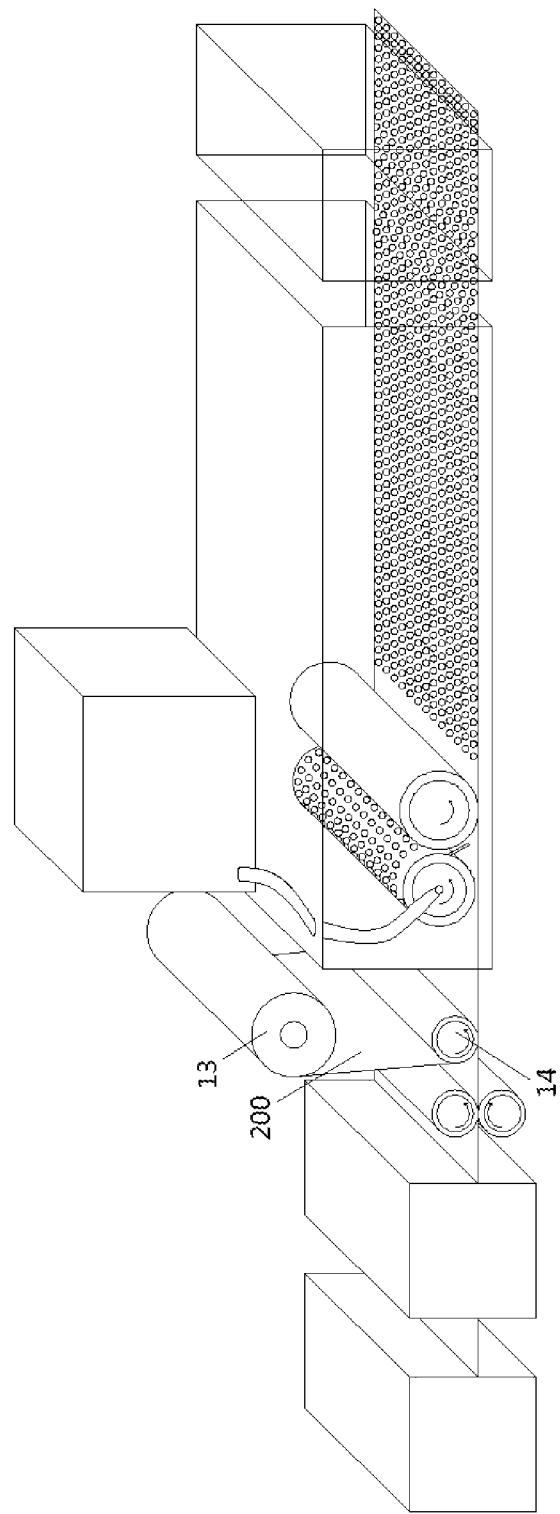
FIG. 3 is a schematic structural diagram of another exemplary embodiment of coating and foaming equipment for an anti-slip, noise reducing pad directly applied and adhered to the back of a flooring material.

As shown in FIG. 3, the structure of this embodiment is basically identical with that of Embodiment 16. To facilitate displaying the structure of the device, the roller 4, the material tube 7, the scraper 8, and the brush roller 9 in the oven 3 are not shown labeled in the drawing. FIG. 3 also includes a mesh coil feeding device 13 and a mesh conveying roll 14. The mesh coil feeding device 13 is arranged above the flooring material as the flooring material is conveyed toward and into the oven. As the mesh coil feeding device rotates, mesh 200 is unwound and directed from above onto the flooring material in a position between the upper roll and the coating roller. The mesh is laid on the flooring material by the mesh conveying roll 14. The flooring material then enters under the coating roller. The rotating speed of the mesh coil feeding device may match the feeding speed of the upper roll and lower roll, such that the speed of laying the mesh on the flooring material equals the speed of advancement of the flooring.

Figure 4:
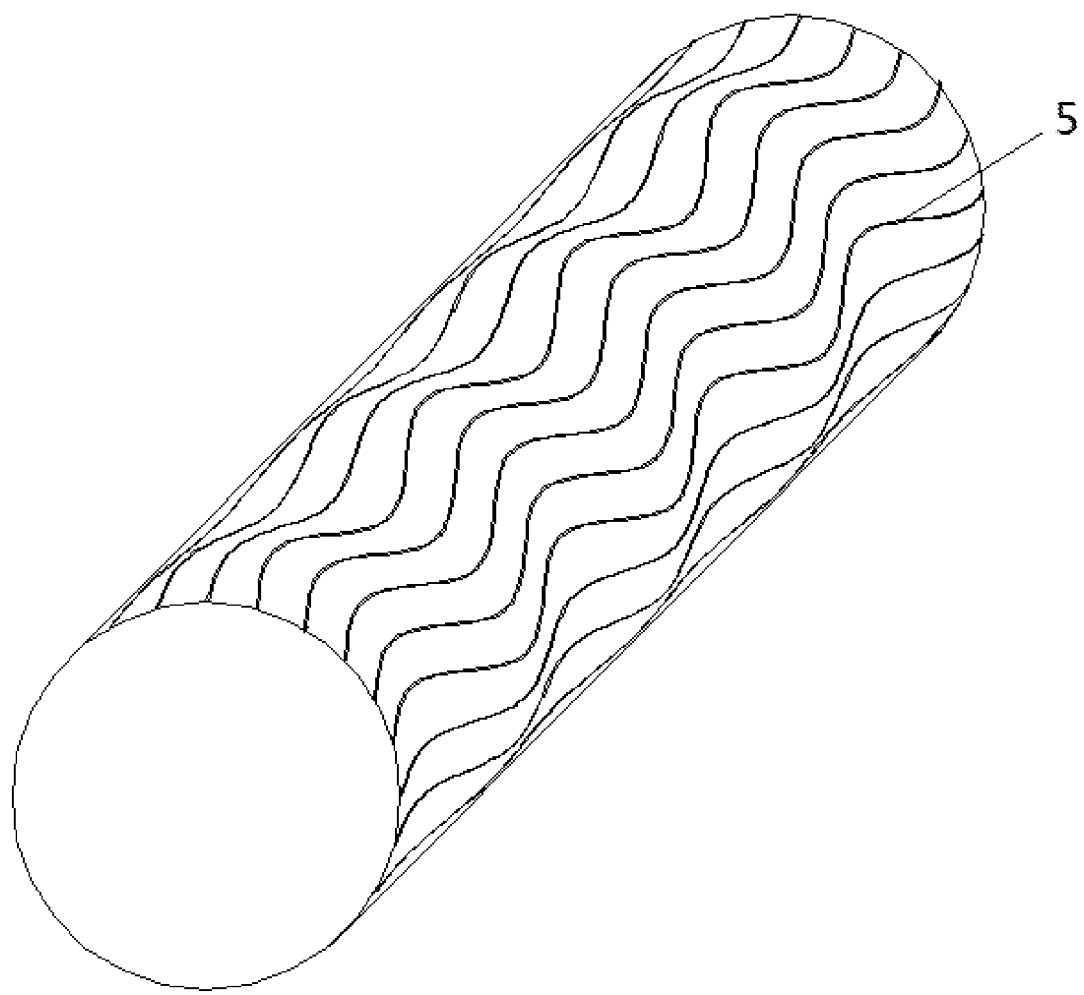
FIG. 4 is a schematic structural diagram of an exemplary embodiment of a coating roller.
Figure 5:
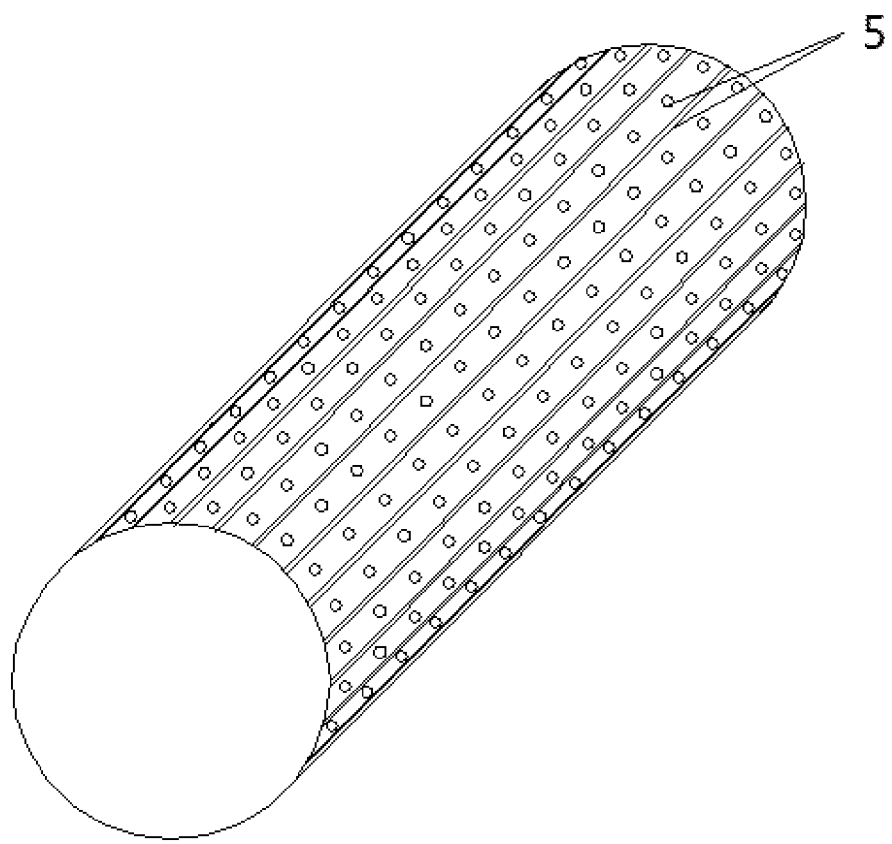
FIG. 5 is a schematic structural diagram of another exemplary embodiment of a coating roller.
Figure 6:
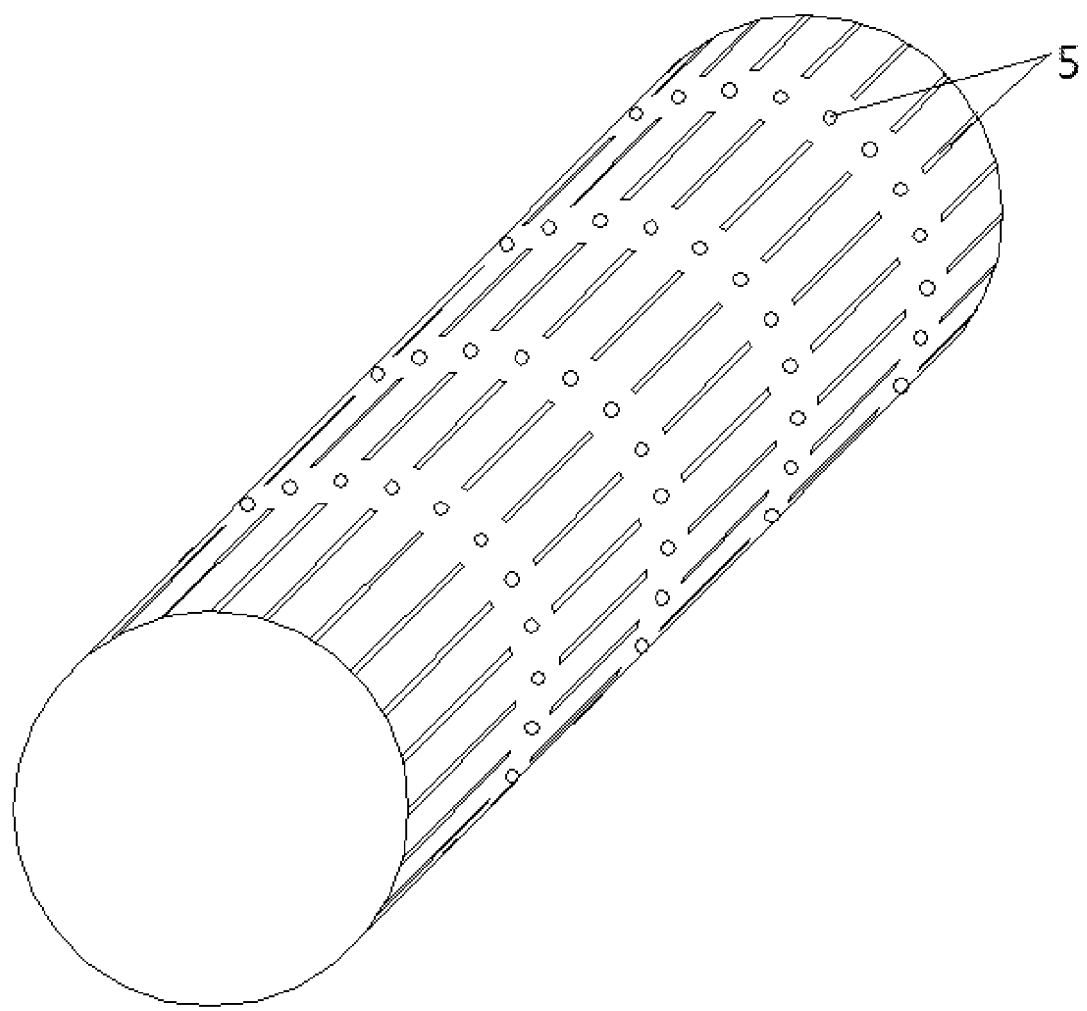
FIG. 6 is a schematic structural diagram of another exemplary embodiment of a coating roller.
Figure 7:
FIG. 7 is a schematic structural diagram of another exemplary embodiment of a coating roller.

FIG. 4 shows a coating roll having through-holes 5 located on the outer surface of the coating roller that are continuous and curvilinear slots. FIG. 5 shows a coating roll having through-holes 5 located on the outer surface of the coating roller that comprise two patterns: the first of which is a line of dotted holes across the outer face of the roll, the second of which is an elongated slot across the outer face of the roll. FIG. 6 shows a coating roll having through-holes 5 located on the outer surface of the coating roller that are generally arranged in an alternately dot and slot pattern in lines across the outer face of the roll. FIG. 7 shows a coating roll having through-holes 5 located on the outer surface of the coating roller that are generally arranged in a selected combination of patterns and characters.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

What is claimed is:

1. Flooring material comprising a substrate having a bottom surface with a backing layer for reducing slip and noise when the flooring material is in use, the backing layer comprising a polyvinyl chloride material adhered to the flooring without using other adhesive material, the polyvinyl chloride material having a foamed inner structure with a resilient outer surface layer, the polyvinyl chloride material being adapted and configured to foam to form the foamed inner structure when sufficiently heated, the polyvinyl chloride material being adapted and configured to produce the resilient outer surface layer when the polyvinyl material is sufficiently quenched after being heated.

2. The flooring material of claim 1 wherein the substrate comprises at least one of ceramic tile, granite, marble, laminate, engineered wood, solid wood, magnesium oxide, fiber board, stone and carpet.

3. The flooring material of claim 1 wherein the polyvinyl chloride material covers the bottom surface of the substrate in a pattern comprising one of dots and lines.

4. The flooring material of claim 1 further comprising a mesh adhered to the bottom surface of the substrate with the polyvinyl chloride material.

5. The flooring material of claim 4 wherein the mesh is at least one of a fiberglass mesh, a polyester mesh, a polyamide mesh, a spandex mesh, and a cotton mesh.

* * * * *